US007409118B2

(12) United States Patent
Said et al.

(10) Patent No.: US 7,409,118 B2
(45) Date of Patent: Aug. 5, 2008

(54) MONOLITHIC TRANSLATION STAGE DEVICE

(75) Inventors: Ali Said, Ann Arbor, MI (US); Philippe Bado, Ann Arbor, MI (US); Mark Allen Dugan, Ann Arbor, MI (US); Yves Bellouard, Waalre (NL)

(73) Assignee: Translume, Inc., Ann Arbor, MI (US)

( * ) Notice: Subject to any disclaimer, the term of this patent is extended or adjusted under 35 U.S.C. 154(b) by 267 days.

(21) Appl. No.: 11/403,384

(22) Filed: Apr. 12, 2006

(65) Prior Publication Data
US 2007/0242916 A1    Oct. 18, 2007

(51) Int. Cl.
*G02B 6/00*    (2006.01)
(52) U.S. Cl. .......................................... 385/12; 385/13
(58) Field of Classification Search .............. 385/12–14
See application file for complete search history.

(56) References Cited

U.S. PATENT DOCUMENTS

| 6,467,761 | B1 * | 10/2002 | Amatucci et al. | ............. 269/58 |
| 6,859,299 | B1 * | 2/2005 | Chiao | ......................... 359/290 |
| 7,079,299 | B1 * | 7/2006 | Conant et al. | ................ 359/224 |
| 7,308,747 | B2 * | 12/2007 | Smith et al. | ..................... 29/43 |

OTHER PUBLICATIONS

Bado et al, Laser Based fabrication of a displacement sensor with an integrated high-accuracy postion sensor, Photonics West, San Jose, 2006.
Kamata et al, Fabrication of waveguide-based vibration sensors by femtosecond laser micromachining, CLEO, Baltimore, MD, 2005.
Bellouard et al, High Accuracy Micro-Displacement Sensor With Integrated Optics-based Detection Means, ICRA, Barcelona, Spain, 2005.
Bado et al, Manufacturing of High Quality Integrated Optical Components by Laser Direct-Write, ICALEO, Jacksonville, FL, 2003.
Bellouard et al, Integrating optics and micro-mechanics in a single substrate, Optics Express, Aug. 22, 2005, vol. 13, No. 17, OSA, USA.
Keoschkerjan et al., "A Novel Microgripper with Parallel Movement of Gripping Arms," *Actuator 2002*, 8th *Int'l Conf. on New Actuators*, pp. 312-324 (2002).
Salim, et al., "Microgrippers created in microstructurable glass," *Microsystem Technologies*, vol. 4, pp. 32-34 (1997).

* cited by examiner

*Primary Examiner*—Sung Pak
*Assistant Examiner*—Daniel Petkovsek
(74) *Attorney, Agent, or Firm*—Lempia Braidwood LLC (57) ABSTRACT

A monolithic device for determining a translation, the monolithic device being fabricated from a single continuous piece of a glass substrate. The monolithic device comprises at least one frame, a moving platform linked to the at least one frame and an optical transducer. The at least one frame is fabricated from the glass substrate. The moving platform is fabricated from the glass substrate, wherein the moving platform is linked to the at least one frame via at least one elastic hinge. The at least one elastic hinge is also fabricated from the glass substrate. The optical transducer is imbedded into the moving platform and the at least one frame.

19 Claims, 4 Drawing Sheets

MONOLITHIC TRANSLATION STAGE DEVICE

This invention was made with government support under contract No. W56HZV-04-C-0009 awarded by United States Army. The government has certain rights in the invention.

FIELD OF THE INVENTION

The present invention relates to monolithic translation stages and, more specifically, to a microstage device that incorporates optical waveguides for determining a translation.

BACKGROUND OF THE INVENTION

Alignment and positioning equipment are important as they are required in nearly all research and manufacturing processes. Conventionally, translation stages are used extensively in the industry for alignment and positioning. Translation stages provide a motion or a translation when a force is applied onto them. The motion may be a desired end action, or the motion may be a way to measure the force applied onto or by the translation stage. In the former case the translation stage is used to position or move objects, while in the latter case the stage is used to measure or sense a force. Translation may be linear, or rotational, or a combination of both. Translation maybe along one axis or along several axes.

Some existing translation stages employ transducers to provide a signal that is a function of the translation stage position with respect to a reference frame. Often these translation stages measure or monitor electrical or magnetic parameters to determine their position. These translation stages may be affected by electromagnetic fields and the results may not be very accurate. Conversely, electrically powered translation stages may also create perturbation in the surrounding EM field. This is particularly undesirable in instruments based on magnetic resonance. Moreover, since most translation stages are opaque, their use is constrained in many applications, for example to move samples under a microscope, or to perform spectroscopy.

Further, some transducers measure or monitor optical parameters to determine the translation stage position. These are known as optical transducers. Optical transducers are known in the art and generally employ a light-source and an optical-detector and some means to vary an intensity of light falling on the optical-detector in accordance with the displacement of the translation stage. However, the accuracy of these translation stages that use optical transducers can be affected by vibrations, high temperatures, temperature changes or air turbulence.

Translation stages are generally made of metal. More recently, some microstages have been made of silicon. Most of the existing translation stages, which incorporate position transducers, are non-monolithic devices. They are made of multiple pieces, often of different materials, which are fastened together. High accuracy translation stages are factory calibrated. The calibration and general performance of the devices are susceptible to vibrations and the manufacturing is rather complex. Furthermore, in some cases, calibration procedures have to be performed regularly to maintain a desired level of accuracy. Therefore, most of the existing translation stages are affected by high temperature, electromagnetic fields, vibrations, shocks and air turbulences. Most existing translation stages are also subject to wear. Furthermore they may not be compatible with chemically sensitive applications.

Therefore, there is a need for a translation stage which gives accurate results and which is not, or less, affected by high temperatures, electromagnetic fields, vibrations, shocks, air turbulences, and chemically corrosive or sensitive environments.

SUMMARY

An aspect of the invention is to provide a monolithic device for determining a translation. The monolithic device is fabricated from a single continuous piece of a glass substrate.

In order to fulfill above aspect, the monolithic device comprises at least one frame, a moving platform continuous with the at least one frame, and an optical transducer. The frame and the moving platform are fabricated from the glass substrate. The moving platform is linked to the frame via at least one elastic hinge that forms a continuous material link between the platform and the frame. The at least one elastic hinge is also fabricated from the glass substrate and is part of the same substrate. The optical transducer is located in, and fabricated from, the glass substrate constituting the moving platform and the frame.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Before describing in detail embodiments that are in accordance with the present invention, it should be observed that the embodiments reside primarily in combinations of apparatus components related to a monolithic translation stage device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Generally speaking, pursuant to various embodiments, the present invention proposes a monolithic device that can be used for sensing a translation or that can act as a force or a position sensor. An optical transducer is embedded into the monolithic device. The optical transducer converts a translation into an optical signal. The motion may be a desired end action or a way to measure a force applied on or by the monolithic device. Those skilled in the art will realize that employing an optical transducer offers a high immunity to electromagnetic interferences. Those skilled in the art will also realize that the force applied on or by the device may be originating from various physical phenomena (like thermal changes, flow density change in fluids, etc.). Therefore, work done on or by the device can be used to measure indirectly various physical quantities (pressure, acceleration, vibration, torque, stress, strain, etc.) through a force measurement.

Figure 1:
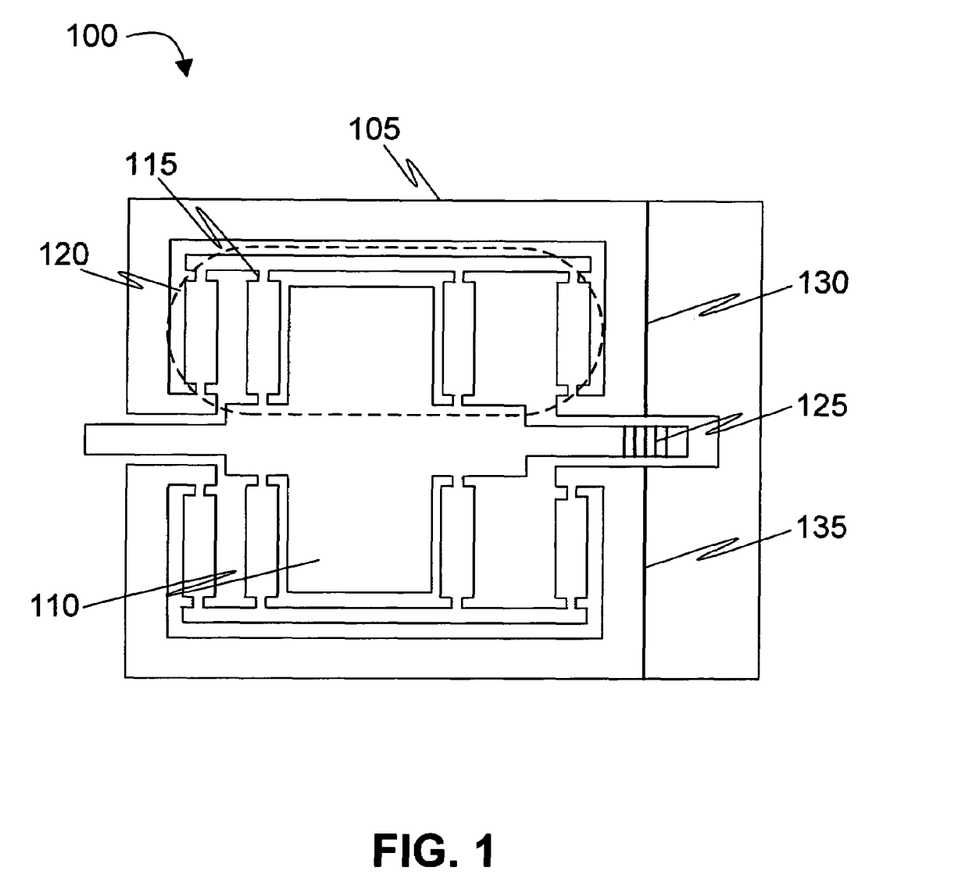
FIG. 1 illustrates an exemplary depiction of a monolithic device for determining a translation in accordance with an embodiment of the present invention.

Turning now to FIG. 1, an exemplary depiction of a monolithic device 100 for determining a translation is shown in accordance with an embodiment of the present invention. A monolithic device is defined in the art as a device fabricated from a single continuous piece of material. In an embodiment of the present invention, monolithic device 100 is fabricated from a single continuous piece of glass substrate. In another embodiment of the present invention, monolithic device 100 can be fabricated from a fused silica substrate. In yet another embodiment of the present invention, monolithic device 100 is fabricated from a fused quartz substrate.

Monolithic device 100 can be a mechanical translation device. A mechanical translation device moves approximately a precise distance in a predefined direction, for example along a well-defined axis. The concept of the mechanical translation device can be extended to translation along multiple axes. Moreover, monolithic device 100 can be a microstage device. In context of the present invention, the microstage device can be defined as the mechanical translation stage that is physically small and for which the range of translation is limited to small distances. A displacement due to the translation may be a desired end action or a way to measure a force applied on monolithic device 100. Monolithic device 100 can, therefore, be used as a displacement sensor, a force sensor, a position sensor, or a work sensor.

Monolithic device 100 can comprise a frame 105, a moving platform 110 and an optical transducer. Frame 105 is continuously linked to moving platform 110 using one or more elastic hinges, such as elastic hinge 115. The exemplary depiction of monolithic device 100 as shown in FIG. 1 shows sixteen elastic hinges, however, those skilled in the art will realize that any number of elastic hinges can be used and all such embodiments are within the scope of the present invention. Also, the shape and the size of monolithic device 100, frame 105, moving platform 110 and the elastic hinges are not restricted to the exemplary depiction in FIG. 1. Various types of elementary elastic hinges can be considered (like notch hinge, cantilever hinge, cross-pivot hinge, etc). Other monolithic flexures with a similar function can be designed through topology optimization methods.

A combination of elastic hinges and rigid bodies 120 forms a flexure which acts as an ideal guidance mechanism for translation stages requiring sub-micron position or displacement resolution. A monolithic flexure does not have any friction and does not require assembly. Therefore, it eliminates stiction, component wear, non-reproducible contact points and assembly misalignment that are common in conventional guidance mechanisms such as bearing stages. Furthermore, a displacement of the flexure is completely reversible as long as the maximum strain in the mechanical flexure remains below the ultimate tensile stress of the glass substrate used to construct the mechanical flexure.

Moving platform 110 can move in a predefined direction or a predefined motion with respect to frame 105 with the help of the elastic hinges, such as elastic hinge 115. For example, in one embodiment of the present invention, moving platform 110 can move in the predefined direction, say, in an x-axis direction. In another embodiment of the present invention, moving platform 110 can move in the predefined direction, say, the x-axis direction as well as in a y-axis direction. Moreover, the predefined motion in one embodiment can be a linear motion and in another embodiment the predefined motion can be an arc with a certain radius of curvature. More complex trajectory can also be obtained by varying the number and the arrangement of hinges used. An extent to which moving platform 110 moves in a predefined direction or in a predefined motion can be detected using the optical-transducer.

The optical transducer, which is imbedded in monolithic device 100, can comprise a first-optical-waveguide-array 125, an input-waveguide 130 and an output waveguide 135. Input-waveguide 130 and output waveguide 135 together form a second-optical-waveguide-array. First-optical-waveguide-array 125 is imbedded in moving platform 110 and the second-optical-waveguide-array is imbedded in frame 105. In one embodiment of the present invention, there is more than one input waveguide and more than one output waveguide.

As mentioned earlier, the optical transducer can convert a motion to an optical signal. The motion may be a desired end action or a way to measure a force applied on the monolithic device. The optical transducer can absolutely determine a relative position of frame 105 and moving platform 110 to a high resolution, over a large range. An optical-signal with a constant intensity is passed through input-waveguide 130. The optical-signal passes through first-optical-waveguide-array 125. If moving platform 110 moves and there is a lateral misalignment between first-optical-waveguide-array 125 and the second-optical-waveguide-array, an intensity of the optical-signal may vary. A pattern of changing intensity is explained in detail in conjunction with FIG. 3. The optical-signal with varying intensity is obtained from output-waveguide 135. Studying the pattern of the varying intensity of the optical-signal, an accurate change in position of moving platform 110 can be estimated. Moreover, the intensity of the optical-signal remains unchanged in electromagnetic interferences. Therefore, chances of estimating an incorrect change in position are minimal.

In an embodiment of the present invention, monolithic device 100 is coupled to a light-source and an optical-detector to form a complete position transducer. The light-source and the optical-detector can be directly attached to frame 105. In an alternate embodiment of the present invention, the light-source and the optical detector can be positioned remotely and connected through optical fibers.

The light-source provides the optical-signal to monolithic device 100. When the optical-signal provided by the light source passes through first-optical-waveguide-array 125, the intensity of the optical-signal may vary when there is a lateral misalignment between first-optical-waveguide-array 125 and the second-optical-waveguide-array. The optical-detector, then, detects the intensity of the optical-signal. Based on the varying intensity detected by the optical-detector, a position-change or a motion of moving platform 110 with respect to frame 105 can be estimated. Those skilled in the art will realize that monolithic device 100 can be coupled to more than one optical-detector, each optical-detector having its own accuracy level to detect the intensity of the optical-signal.

In another embodiment of the present invention, an actuating element is coupled to monolithic device 100. The actuating element provides a stimulus to moving platform 110. Monolithic device 100 can further act as a force sensor. For example, if a force exerted by a device is to be found out, the device can be coupled to monolithic device 100 and can be used as the actuating device. An optical-signal can be passed through input-waveguide 130 of monolithic device 100. The device can then exert the force on moving platform 110. Due to the force, moving platform 110 moves and the intensity of the optical-signal passing through first-optical-waveguide-array 125 varies due to the lateral misalignment between first-optical-waveguide-array 125 and the second-optical-waveguide-array. This varying intensity is obtained at output-waveguide 135. The optical detector can detect the varying intensity of the optical-signal. The displacement of moving platform 110 can be estimated and in turn the magnitude of the force exerted by the device can be found. This way, monolithic device 100 can act as a displacement, a force, a position sensor and a work sensor.

In an embodiment of the present invention, monolithic device 100, first-optical-waveguide-array 125, input-waveguide 130 and output-waveguide 135 are designed to minimize unwanted-light. Unwanted-light can cause the optical-detector to detect an inaccurate intensity of the optical-signal. Therefore, means to block the unwanted-light can be beneficial to detect the intensity of the optical-signal with high-accuracy. For example, monolithic device 100 can be fabricated such that a blocking mechanism to block the unwanted-light can be introduced. This blocking mechanism can be implemented by coating monolithic device 100. In an embodiment of the present invention, to block scattered light from reaching an optical-detector an input-waveguide and an output-waveguide can be angled or made to bend so that an offset is introduced between the optical-signal, the detected optical-signal, and first-optical-waveguide-array and second-optical-waveguide-array. Here the optical-detector is not in the line of sight of the major scattering sources. Also air trenches can be fabricated in the substrate so as to intercept scattered light at an angle where total internal reflection can redirect the light away from the optical-detector. Alternatively, these air trenched can be filled with a material that absorbs the scattered light.

Figure 2:
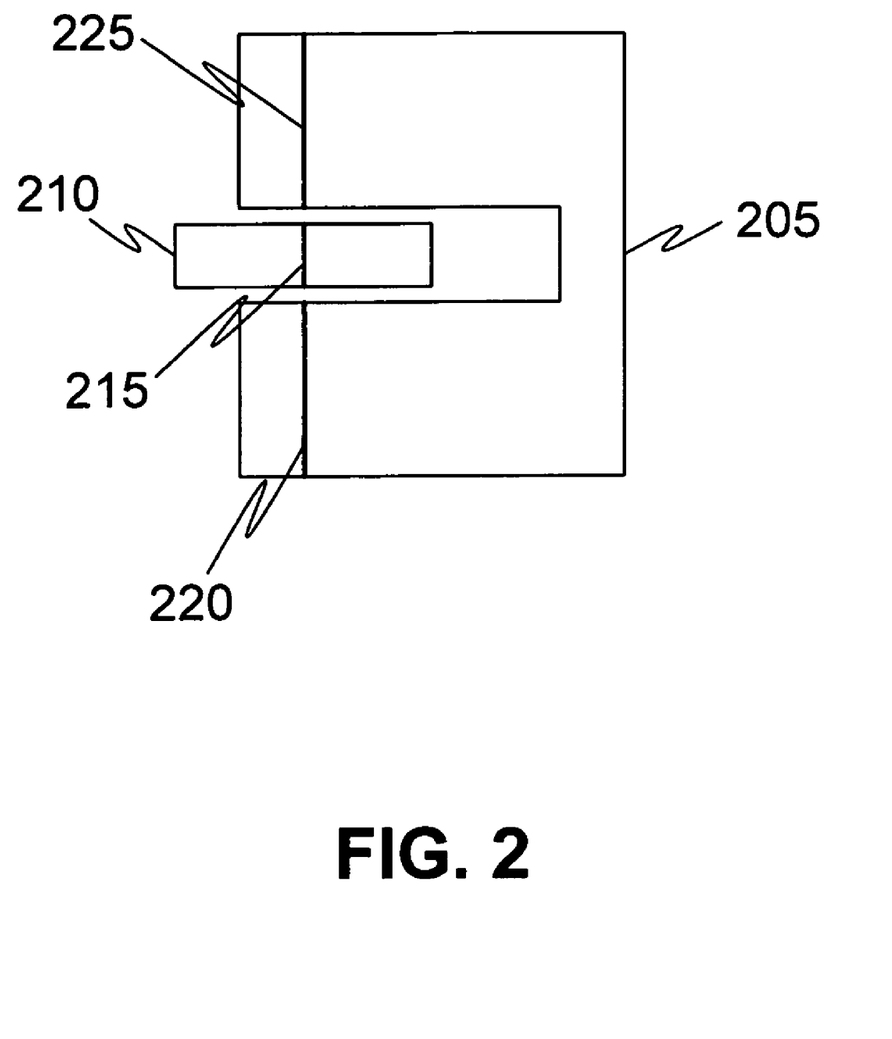
FIG. 2 illustrates a block diagram depicting a monolithic-device-section comprising an optical transducer in accordance with an embodiment of the present invention.

Turning now to FIG. 2, a block diagram depicting a monolithic-device-section comprising an optical transducer is shown in accordance with an embodiment of the present invention. A relevant section of frame 105 is depicted as a frame-section 205. Similarly a relevant section of moving platform 110 is depicted as a moving-platform-section 210. A first-optical-waveguide-array 215 is imbedded in moving-platform-section 210. Therefore, first-optical-waveguide-array 215 is, basically, a mobile waveguide. Those skilled in the art will realize that first-optical-waveguide-array 215 can be mobile in at least one predefined direction or at least one predefined motion. A second-optical-waveguide-array is imbedded in frame-section 205. The second-optical-waveguide-array comprises an input-waveguide 220 and an output-waveguide 225.

As mention earlier, the present invention is based on a varying intensity of an optical-signal induced by lateral misalignment between first-optical-waveguide-array 215 and the second-optical-waveguide-array. In an embodiment of the present invention, first-optical-waveguide-array 215 is incorporated or imbedded in moving-platform-section 210 so that, at rest, first-optical-waveguide-array 215 is aligned with input-waveguide 220 and output-waveguide 225 as illustrated in FIG. 2. The optical-signal enters the monolithic device-section from input-waveguide 220. The optical-signal then passes through first-optical-waveguide-array 215 and comes out from output-waveguide 225. The optical-signal can be generated by a light-source and can be detected using an optical-detector. The light-source and the optical detector can be coupled to the monolithic device-section. In the present embodiment, the intensity of the optical-signal detected at the optical-detector is approximately constant since there is no lateral misalignment between first-optical-waveguide-array 215 and the second-optical-waveguide-array.

Figure 3:
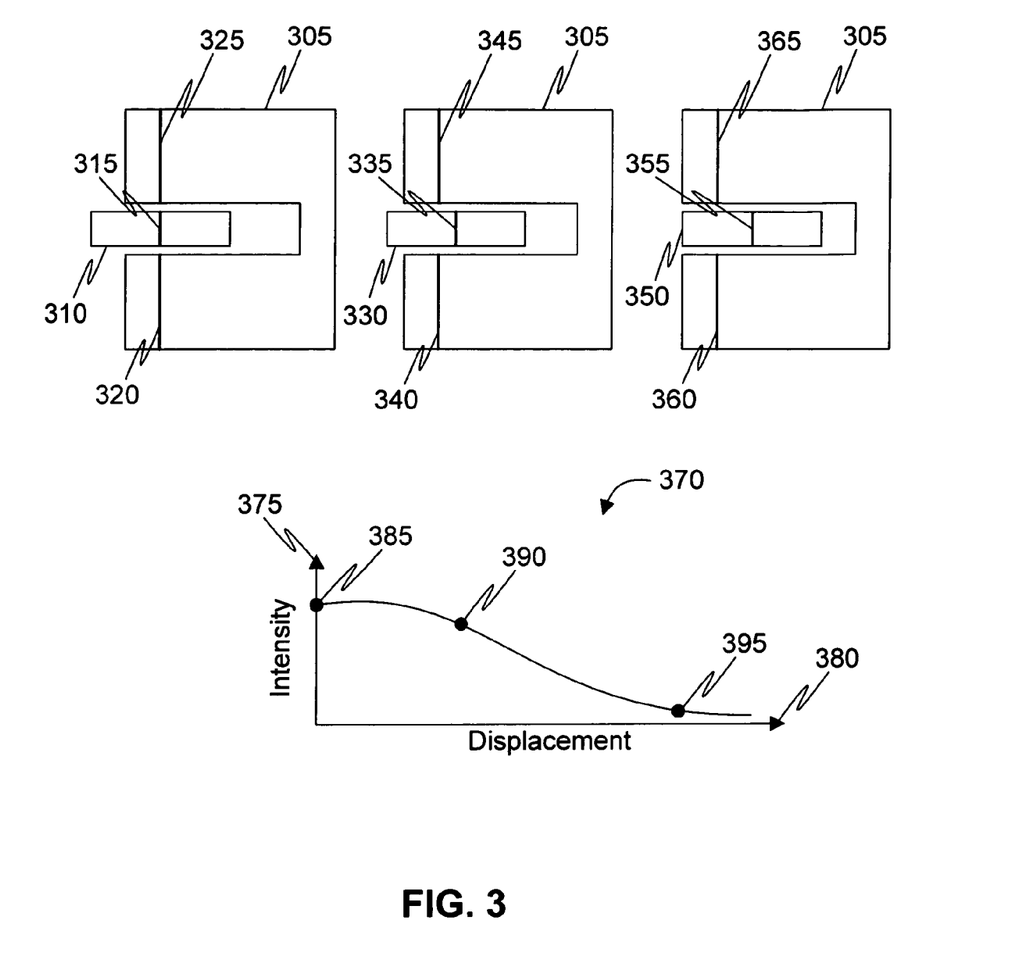
FIG. 3 illustrates a block diagram depicting a working of an optical transducer in accordance with an embodiment of the present invention.

Turning now to FIG. 3, a block diagram depicting a working of an optical transducer is shown in accordance with an embodiment of the present invention. A section of a frame, a frame-section 305, and a section of a moving platform, a moving-platform-section, in three different situations are shown in FIG. 3. First situation is when the moving-platform-section is in a moving-platform-section-position 310, such that the moving-platform-section is at rest with respect to frame-section 305. Moving-platform-section-position 310 is same as that depicted in FIG. 2, for example a first-optical-waveguide-array 315 is aligned with input-waveguide 320 and an output-waveguide 325. Second situation is when the moving-platform-section is in a moving-platform-section-position 330, such that the moving-platform-section displaces to the right with respect to frame-section 305. A first-optical-waveguide-array 335 is, therefore, not aligned with input-waveguide 340 and an output-waveguide 345. Third situation is when the moving-platform-section is in a moving-platform-section-position 350, such that the moving-platform-section displaces further to the right with respect to frame-section 305. In this situation a first-optical-waveguide-array 355 is misaligned with input-waveguide 360 and an output-waveguide 365 to a larger extent than in the second situation.

In the present embodiment, the first-optical-waveguide-array, depicted in the three situations, comprises a single waveguide-segment. Those skilled in the art will realize that using the single waveguide-segment can limit an optical-detector to a detecting range that is approximately equal to a width of a mode-field diameter (MFD) associated with the first-optical-waveguide-array. The use of a tapered waveguide terminus can change the MFD and thereby change the detecting range and sensitivity. In an embodiment of the present invention, to extend the detecting range, the single waveguide-segment can be replaced with an array of parallel waveguide-segments. The embodiment of the present invention, which uses an array of parallel waveguide-segments, is described in detail in conjunction with FIG. 3.

In an embodiment of the present invention, a light-source and an optical-detector can be coupled to frame-section 305. As mentioned earlier, an optical-signal with a constant intensity is provided by the light-source and when the moving-platform-section moves, the optical-signal with varying intensity is detected by the optical-detector. A graph 370 depicts a relationship between the intensity of the optical-signal detected at the optical-detector and the displacement of the moving-platform-section. An axis 375 depicts a magnitude of the intensity of the optical-signal in the three situations and an axis 380 depicts a magnitude of the displacement of the moving-platform-section in the three situations. In the first situation, where first-optical-waveguide-array 315 is aligned with input-waveguide 320 and output-waveguide 325, the intensity of the output-signal, detected at the optical-detector, is maximized and is depicted at 385. In this situation, the intensity of the optical-signal obtained at output-waveguide 325 is maximized since the optical-signal is properly guided through input-waveguide 320, first-optical-waveguide-array 310 and output-waveguide 325. Conversely, in the second situation, where the moving-platform-section is in moving-platform-section-position 330, first-optical-waveguide-array 335 is misaligned with input-waveguide 340 and output-waveguide 345. In this situation, the optical-signal provided by the light-source is only guided through input-waveguide 340 and no longer fully guided through the moving-platform-section. This misalignment, thus, results in loss of the optical-signal obtained at output-waveguide 345 and the intensity of the optical-signal detected by the optical-detector is less, as depicted at 390, than the intensity detected in the first situation, as depicted at 385. In the third situation, since the moving-platform-section moves even further to the right as shown by moving-platform-section-position 350, the intensity of the optical-signal detected by the optical-detector, as depicted at 395, is even lesser than that in the second situation.

The varying intensity of the optical-signal detected by the optical-detector, as shown in graph 370, can enable the determination of an accurate measure of a change in position of a moving platform. Those skilled in the art shall appreciate that the detecting range of the optical-transducer can be extended indefinitely with the approach of the present invention. In one embodiment, the detecting range is improved by imbedding the moving platform with multiple parallel waveguide-segments instead of a single waveguide-segment. Improvement to the detecting range and sensitivity can also be realized by reducing the space between the multiple parallel waveguide-segments. Those skilled in the art will realize that this reduction in space can be carried out only to an extent that the waveguide-segments are not optically connected through evanescence field effects. In another embodiment the second-optical-waveguide-array can have a variable pitch to change the force versus displacement signal response to meet application specific requirements. For example, these requirements maybe to identify absolute stage positioning without maintaining a fringe count or to change signal sensitivity with displacement (to account for a changing restoring force or to linearize a signal response).

In another embodiment of the present invention, the detection range is improved by using multiple waveguide-segments in the input-waveguide and in the output-waveguide. For example, a direction sensitive, quadrature scheme can be realized using a one-by-four splitter of the optical-signal relayed to different waveguide-segments and aligned at, say a one-fourth pitch offsets. A signal threshold can determine which of the four waveguide-segments of the output-waveguide to monitor. Those skilled in the art will realize that the number of waveguide-segments in the input-waveguide can be the same as the number of waveguide-segments in the output-waveguide. With an appropriate choice of optical waveguide geometry determining a mode, a shape and a size, a high and a uniform signal-to-noise ratio (SNR) can be maintained for a full range of displacement of the moving platform. When multiple waveguide-segments are imbedded in the input-waveguide and in the output-waveguide, different optical-signals can be used for different waveguide-segments in the input-waveguide. Thus, a unique intensity curve for each optical-signal may be obtained, similar to graph 370. This embodiment improves detection of displacement of the moving platform, sensitivity and uniformity.

In another embodiment of the present invention, there can be multiple waveguide-segments imbedded in the moving platform as well as in the frame. In yet another embodiment of the present invention, there may be a single input-waveguide, which splits into multiple input-waveguides prior to reaching the moving platform. This embodiment can simplify the fiber-waveguide interfacing.

Figure 4:
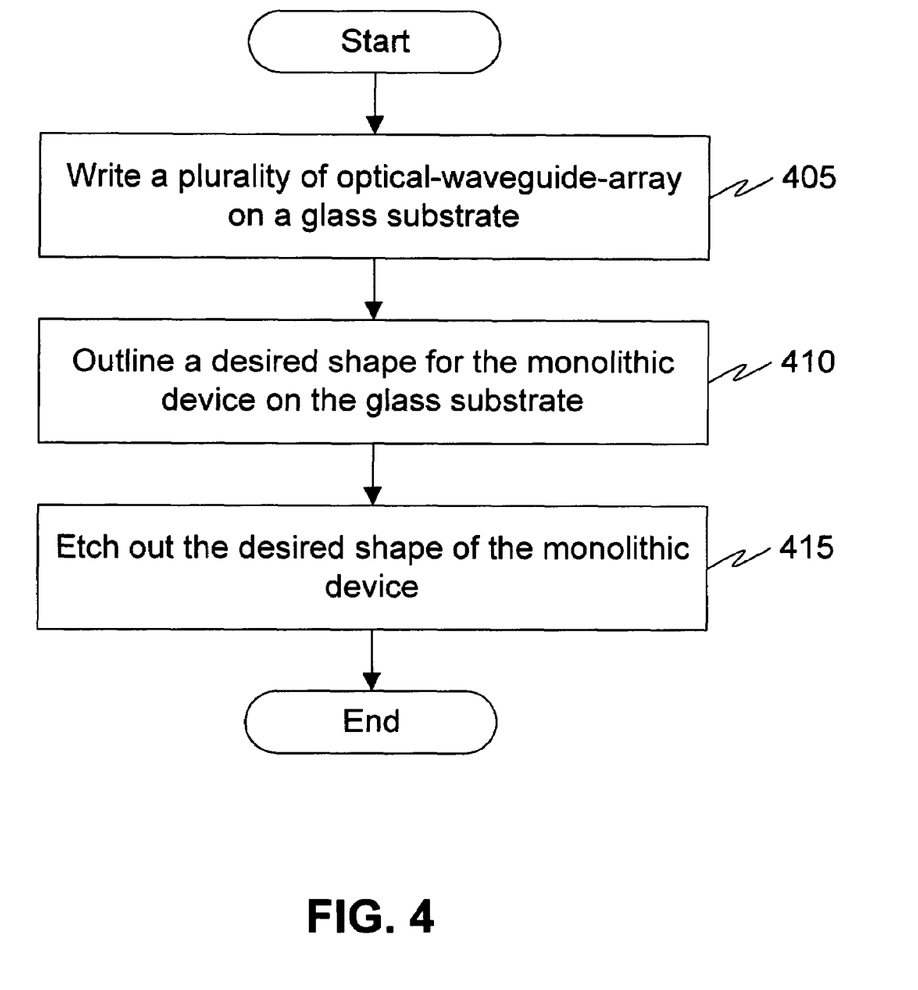
FIG. 4 illustrates a flow diagram of a process for manufacturing a monolithic device in accordance with an embodiment of the present invention.

Turning now to FIG. 4, a flow diagram of a process for manufacturing a monolithic device is shown in accordance with an embodiment of the present invention. The monolithic device is fabricated from a single continuous piece of a glass substrate. It would be apparent to a person skilled in the art that any glass material that is transparent at the manufacturing wavelength can be used to fabricate monolithic device 100, and all such embodiments are within the scope of the present invention. To initiate the process, the glass substrate is loaded in a workstation. A plurality of optical-waveguide-array can then be written in the glass substrate at step 405. A laser technology is used for writing the optical-waveguide-arrays. The laser technology can comprise using an ultra-fast laser, such as a femtosecond laser. The femtosecond laser technology is based on the use of extremely short laser pulses, shorter than 10 picoseconds, which are focused inside the glass substrate. At a focal point where the laser pulses are focused, the intensity of the laser pulses is so high that the glass substrate is instantly turned into plasma. Since the pulses are short, the glass substrate immediately re-solidifies. Processing with proper parameters, a local structure of the re-solidified glass substrate can be controlled and at least one physical property of the re-solidified glass substrate can be modified. The physical property can be a refractive index of the glass substrate. The femtosecond laser technology resulting in a local refractive index change is referred to as femtoWrite The ultra-fast laser technology, such as femtoWrite, is used to write a first-optical-waveguide-array and a second-optical-waveguide-array on the glass substrate. While writing, the refractive index of the glass substrate changes. Therefore, the first-optical-waveguide-array and a second-optical-waveguide-array may have the same refractive indices but their refractive indices are different from the refractive index of the glass substrate. Those skilled in the art will realize that when an optical-signal is passed through the first-opticalwaveguide-array while the second-optical-waveguide-array is aligned with the first-optical-waveguide-array, the optical-signal gets a directed path. However, when the second-optical-waveguide-array is not aligned with the first-optical-waveguide-array, the optical-signal may not be able to completely pass through the second-optical-wave guide-array.

A desired shape for the monolithic device is now outlined on the glass substrate at step 410. The outlined can also be done using the ultra-fast laser technology, such as femtoWrite. The desired shape of the monolithic device can comprise one or more frames, a moving platform and one or more elastic hinges. One or more mechanical elastic hinges form a continuous material link between the moving platform and the frame. In an embodiment of the present invention, the desired shape can be the shape, as shown in FIG. 1. The desired shape is outlined such that the first-optical-waveguide-array is imbedded in the moving platform and the second-optical-waveguide-array is imbedded in the frame. The second-optical-waveguide-array can comprise an input-waveguide and an output-waveguide. Therefore, the optical-waveguide-arrays and the desired shape are written such that when the optical-signal enters the monolithic device from the input-waveguide, the optical-signal obtains a directed path towards the first-optical-waveguide-array and from the first-optical-waveguide-array to the output-waveguide. The intensity of the optical-signal may change while traveling from the input-waveguide to the first-optical-waveguide-array and from the first-optical-waveguide-array to the output-waveguide. Those skilled in the art will recognized that step 410 can be performed prior to step 405.

After outlining the desired shape of the monolithic device, the glass substrate can be unloaded from the workstation and the desired shape can then be etched out at step 415. The femtosecond laser writing technology resulting in a local change in chemical reactivity of the glass substrate is referred to as femtoEtch. In one embodiment of the present invention, the outlined desired shape is immersed in a hydrofluoric acid (HF) bath. Parts of the desired shape that have been exposed to the femtosecond laser are then preferentially etched away. This operation results in a three-dimensional glass body of the desired shape. A measured etching rate can be on the order of a few microns per minute in the parts that are exposed to the femtosecond laser as opposed to a few microns per hour in the remaining parts of the glass substrate. Those skilled in the art will realize that a highly anisotropic etching, resulting from the laser exposure, can make the fabrication of high-aspect ratio structures possible using appropriate pattern generation methods.

In one embodiment of the present invention, at least one fiber is inserted in the glass substrate while manufacturing the monolithic device. Various features can be fabricated on the monolithic device to ensure optimum registration (alignment) between the waveguides and external components (sources and detectors). Generally these features are shaped recesses at the edge of the substrate into which a fiber or a lens can be attached. In an alternate embodiment the lens can be a monolithic part of the glass substrate.

In an embodiment of the present invention, a light-source and an optical-detector are coupled to the frame. The light-source provides the optical-signal and the optical signal then passes through the input-waveguide, the first-optical-waveguide-array and the output-waveguide. The optical detector, then, detects the intensity of the optical-signal obtained at the output-waveguide. Also, to act as a force sensor, an actuating device can also be fabricated along with the monolithic device, the light-source, and the optical-detector.

In an embodiment of the present invention, the monolithic device can be fabricated such that unwanted-light can be minimized so that the accuracy of the optical transducer is not affected due to interference. For example, the desired shape can comprise a portion that can account for blocking the unwanted light from reaching the optical transducer.

The key aspect of the process of manufacturing the monolithic device is that the various structural, mechanical and optical elements can all be introduced with a same laser workstation in a continuous manufacturing process. Specifically, a need to reposition the glass substrate is obviated. Consequently, the manufacturing technology is intrinsically accurate since the position accuracy depends only on the performance of the motorized stages used to move the glass substrate under the laser.

Moreover, as mentioned earlier, fused silica can be specifically used as a substrate instead of any generic glass. Fused silica is transparent over a large wavelength range, including the ultraviolet and the near-infrared. Therefore, a stage made of fused silica can be used where transparency is important. For example, fused silica can be used as a stage to move samples under a microscope. Also, fused silica can handle high temperatures. A stage made only of fused silica can operate at higher temperature without being significantly affected by thermal expansion since the thermal expansion coefficient of fused silica is very low. Those skilled in the art will realize that a change in the length of the optical waveguides have no impact on the measurements. Furthermore, effect of thermal expansion can be compensated by using a proper flexure design like the one described in the preferred embodiment. Fused silica is also non-electric and non-magnetic in nature. A sensor made only of fused silica can, therefore, operate in high electromagnetic fields. Also many glasses, including notably fused silica, are chemically inert to a wide range of chemicals. A sensor made only from such glasses can operate in chemically corrosive or sensitive environments.

Additionally, a translation stage with an imbedded position sensor, such as the monolithic device proposed in the present invention, is more robust than a translation stage without an integrated position sensor. With an imbedded sensor the accuracy does not decrease with time. The monolithic device can be factory tested and then can be calibrated. Generally, the accuracy of this calibration does not get affected over a period of time.

Also, the monolithic device can be able to operate without electricity. Using the imbedded optical waveguides to measure the displacement or the position of the moving platform, shield the measurement from air turbulence and vibration.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

What is claimed is:

1. A monolithic device for determining a translation, the monolithic device being fabricated from a single continuous piece of a glass substrate, the monolithic device comprising:
at least one frame, the at least one frame being fabricated from the glass substrate;
a moving platform linked to the at least one frame, the moving platform being fabricated from the glass substrate, wherein the moving platform is linked to the at least one frame via at least one elastic hinge, the at least one elastic hinge being fabricated from the glass substrate; and
an optical transducer, the optical transducer being imbedded into the moving platform and the at least one frame, wherein the optical transducer comprises:
a. a first-optical-waveguide-array, the first-optical-waveguide-array being imbedded in the moving platform; and
b. a second-optical-waveguide-array, the second-optical-waveguide-array being imbedded in the at least one frame.

2. The monolithic device of claim 1, wherein the second-optical-waveguide-array comprises at least one input-waveguide and at least one output-waveguide.

3. The monolithic device of claim 2, wherein an optical-signal with a constant intensity is passed trough the at least one input-waveguide and the optical-signal with a varying intensity is obtained from the at least one output-waveguide, the optical-signal passing through the first-optical-waveguide-array and the moving platform moving with respect to the at least one frame.

4. The monolithic device of claim 2, wherein the monolithic device is coupled to a light-source and at least one optical-detector, the at least one optical-detector detecting at least one of a position-change and a motion of the moving platform based on the optical-signal with a varying intensity.

5. The monolithic device of claim 4, wherein an actuating element is coupled to the monolithic device, the actuating element providing a stimulus to the moving platform.

6. The monolithic device of claim 1, wherein the glass substrate is one of a fused quartz and a fused silica.

7. The monolithic device of claim 1, wherein at least one of the monolithic device, the first-optical-waveguide-array and the second-optical-waveguide-array are designed for minimizing an unwanted-light.

8. A device for determining a translation, the device comprising:
a glass body;
a frame region of the glass body;
an elastic hinge region of the glass body;
a platform region of the glass body movably linked to the frame region via the elastic hinge region; and
an optical transducer to sense the translation of the platform region relative to the frame region, the optical transducer comprising a first section in the platform region and a second section in the frame region.

9. The device of claim 8, wherein the first section comprises a waveguide embedded in the moving platform region.

10. The device of claim 8, wherein the first section comprises an array of waveguides embedded in the moving platform region.

11. The device of claim 8, wherein the second section comprises a waveguide embedded in the frame region.

12. The device of claim 8, wherein the second section comprises an input waveguide array embedded in the moving platform region.

13. The device of claim 8, wherein the optical transducer comprises an input waveguide embedded in the frame region and a translation waveguide in the platform region, the input and translation waveguides having a misalignment representative of the translation.

14. The device of claim 8, further comprising a plurality of elastic hinge regions of the glass body, wherein the plurality of elastic hinge regions are configured to enable the platform region to move in a predefined direction and a predefined motion.

15. The device of claim 14, wherein the predefined motion is a linear motion.

16. The device of claim 8, further comprising a trench region of the glass body to direct spurious light away from the optical transducer.

17. The device of claim 8, wherein the second section comprises a waveguide embedded in the frame region, and wherein the waveguide comprises a bend to introduce an offset to avoid detection of spurious light.

18. The device of claim 8, wherein the glass body comprises fused silica.

19. The device of claim 18, wherein the first and sections are defined via a change in refractive index of the fused silica.

* * * * *